United States Patent
Hwang

(10) Patent No.: US 12,438,201 B2
(45) Date of Patent: Oct. 7, 2025

(54) BATTERY RACK HAVING WIRELESS COMMUNICATION OPTIMIZATION STRUCTURE AND ENERGY STORAGE SYSTEM INCLUDING THE SAME

(71) Applicant: LG ENERGY SOLUTION, LTD., Seoul (KR)

(72) Inventor: Ji-Won Hwang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 597 days.

(21) Appl. No.: 17/795,807

(22) PCT Filed: Apr. 27, 2021

(86) PCT No.: PCT/KR2021/005338
§ 371 (c)(1),
(2) Date: Jul. 27, 2022

(87) PCT Pub. No.: WO2021/246647
PCT Pub. Date: Dec. 9, 2021

(65) Prior Publication Data
US 2023/0054678 A1 Feb. 23, 2023

(30) Foreign Application Priority Data
Jun. 4, 2020 (KR) .................. 10-2020-0067904

(51) Int. Cl.
*H01M 10/42* (2006.01)
*H01M 50/204* (2021.01)
(Continued)

(52) U.S. Cl.
CPC ..... *H01M 10/425* (2013.01); *H01M 10/4207* (2013.01); *H01M 50/204* (2021.01);
(Continued)

(58) Field of Classification Search
CPC .................................................. H01M 10/425
See application file for complete search history.

(56) References Cited

U.S. PATENT DOCUMENTS

2014/0055079 A1 2/2014 Lee
2015/0357685 A1 12/2015 Iwasawa et al.
(Continued)

FOREIGN PATENT DOCUMENTS

| CN | 110235299 A | 9/2019 |
|---|---|---|
| JP | 10-32423 A | 2/1998 |

(Continued)

OTHER PUBLICATIONS

English Machine Translation of KR 20180010869 A (Year: 2025).*
(Continued)

*Primary Examiner* — Keith D. Hendricks
(74) *Attorney, Agent, or Firm* — Birch, Stewart, Kolasch & Birch, LLP

(57) ABSTRACT

A battery pack includes a rack housing having a cabinet and a door provided to open and close the cabinet; a plurality of battery modules disposed in the cabinet in a layered form; a plurality of slave modules mounted to the battery modules one by one and having a slave antenna for wireless communication; a master module disposed at one of interlayer, top and bottom of the plurality of battery modules and having a master antenna for wireless communication; and a waveguide installed at an inner surface of the door to form a wireless communication path between the plurality of slave modules and the master module.

10 Claims, 9 Drawing Sheets

(51) Int. Cl.
*H01M 50/24* (2021.01)
*H01P 3/12* (2006.01)
*H01Q 1/22* (2006.01)
*H05K 9/00* (2006.01)

(52) U.S. Cl.
CPC ............. *H01M 50/24* (2021.01); *H01P 3/12* (2013.01); *H01Q 1/22* (2013.01); *H05K 9/0081* (2013.01); *H01M 2010/4271* (2013.01)

(56) References Cited

U.S. PATENT DOCUMENTS

| | | | |
|---|---|---|---|
| 2016/0093843 A1* | 3/2016 | Reineccius | H01M 10/4257 429/61 |
| 2017/0346322 A1 | 11/2017 | Kuran et al. | |
| 2017/0365893 A1 | 12/2017 | Kim et al. | |
| 2018/0025266 A1 | 1/2018 | Sakurai | |
| 2018/0041070 A1 | 2/2018 | Muenster et al. | |
| 2018/0248161 A1* | 8/2018 | Yoshida | H01M 10/441 |
| 2019/0252734 A1 | 8/2019 | Razzell | |

FOREIGN PATENT DOCUMENTS

| | | | |
|---|---|---|---|
| JP | 2002-204240 | A | 7/2002 |
| JP | 4278061 | B2 | 6/2009 |
| JP | 2014-197805 | A | 10/2014 |
| KR | 19990027027 | * | 7/1999 |
| KR | 10-2001-0000010 | A | 1/2001 |
| KR | 10-2012-0021045 | A | 3/2012 |
| KR | 10-2014-0060801 | A | 5/2014 |
| KR | 10-1457191 | B1 | 10/2014 |
| KR | 10-2018-0010869 | A | 1/2018 |
| KR | 20180010869 | A * | 1/2018 |
| KR | 10-1854876 | B1 | 6/2018 |
| KR | 10-1924527 | B1 | 12/2018 |
| WO | 2012/060154 | A1 | 5/2012 |

OTHER PUBLICATIONS

KR 20010000010 A Translation Provided from KR19990027027 A Translation (Application) (Year: 1999).*
International Search Report (PCT/ISA/210) issued in PCT/KR2021/005338, dated Aug. 19, 2021.
Extended European Search Report for European Application No. 21816845.8, dated May 28, 2024.

* cited by examiner

Conventional Art

BATTERY RACK HAVING WIRELESS COMMUNICATION OPTIMIZATION STRUCTURE AND ENERGY STORAGE SYSTEM INCLUDING THE SAME

TECHNICAL FIELD

The present disclosure relates to a battery rack, and more specifically, to a battery rack capable of increasing the reliability of wireless communication by controlling a transmission path of a wireless signal in a battery rack having a wireless control system that includes a master module and a plurality of slave modules, and an energy storage system including the battery rack.

The present application claims priority to Korean Patent Application No. 10-2020-0067904 filed on Jun. 4, 2020 in the Republic of Korea, the disclosures of which are incorporated herein by reference.

BACKGROUND ART

A smart grid is a futuristic power grid that optimizes the operation efficiency of the power grid through bidirectional communication between a supplier and a consumer while monitoring and controlling the power grid in real time by applying the information and communication technology to a power system.

The smart grid may be associated with new power devices such as new and renewable energy generation and charging systems for electric vehicles, which are increasing in recent years. Here, the smart grid may increase the power usage efficiency by providing power usage information of consumers in real time, and thus it is expected to reduce unnecessary investment in power generation facilities and reduce greenhouse gas emissions. Recently, due to issues such as the modernization plan of the power grid and the expansion of new and renewable energy, interest in the smart grid has increased and research thereon is being actively conducted.

One of key technologies related to the smart grid is an energy storage system. The energy storage system is used to achieve load leveling by storing electric energy at off-peak time and use the stored electric energy at peak time. The energy storage system may help to efficiently use power facilities.

Recently, along with the development of lithium ion batteries with high energy storage density, it has become possible to construct a high-voltage, large-capacity energy storage system using a chemical energy storage method.

The energy storage system includes a battery rack that accommodates a plurality of battery modules composed of lithium ion batteries with high energy density in multiple stages.

In order to individually and efficiently manage the states of the plurality of battery modules, a wireless control system (see FIG. 1) having a multi-slave system is disclosed. The wireless control system having a multi-slave system includes a plurality of slave modules for monitoring the state of each battery module 1_1 to 1_N and a master module for integrally controlling the state of the entire battery pack based on the information of each slave module.

However, if the master module and the plurality of slave modules perform wireless communication with each other, the wireless connection between the master module and at least one slave module may be undesirably cut off due to the influence of external noise, and thus it is needed to seek a solution thereto.

DISCLOSURE

Technical Problem

The present disclosure is designed to solve the problems of the related art, and therefore the present disclosure is directed to providing a battery rack capable of control a transmission path of a wireless signal between a master module and a plurality of slave modules and blocking external noise by configuring a waveguide at a door of the battery rack, and an energy storage system including such a battery rack.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

Various embodiments of the present disclosure to achieve the object are as follows.

In one aspect of the present disclosure, there is provided a battery rack, comprising: a rack housing having a cabinet with an inner space formed therein and a door provided to open and close the cabinet; a plurality of battery modules disposed in the inner space of the cabinet stacked in an upper and lower direction; a plurality of slave modules respectively mounted to the plurality of battery modules to monitor a state of each battery module of the plurality of battery modules, each slave module of the plurality of slave modules configured to have a slave antenna for wireless communication; a master module disposed at one of an interlayer, a top and a bottom of the plurality of battery modules to manage states of the plurality of battery modules based on information provided from the plurality of slave modules and configured to have a master antenna for wireless communication; and a waveguide installed at an inner surface of the door to form a wireless communication path between the plurality of slave modules and the master module.

The waveguide may include a body portion having a hollow tube shape and disposed to extend along a height direction of the door; at least one slave docking portion having a first side provided to communicate with the body portion and a second side provided to make surface contact with a slave module of the plurality of slave modules when the door is closed; and a master docking portion having a first side provided to communicate with the body portion and a second side provided to make surface contact with the master module when the door is closed.

The at least one slave docking portion may be a plurality of slave docking portions, and the plurality of slave docking portions may be located at every interval corresponding to an interval of the plurality of battery modules.

The at least one slave docking portion or the master docking portion may include an outer opening provided to cover a location of the slave antenna in the at least one slave module of the plurality of slave modules or a location of the master antenna in the master module; a flange formed to expand along a periphery of the outer opening; and a shield gasket having an external electromagnetic wave shielding function and interposed in the flange.

The shield gasket may be one of a wire mesh gasket and an electromagnetic wave absorbing sponge provided by coating a soft foam with an electromagnetic wave absorbing material.

The at least one slave module and the master module may each include a module cover forming an outer surface, and the module cover may be made of a radio wave blocking material or coated with a radio wave blocking material, except for a region where the slave antenna or the master antenna is located.

The battery rack may further comprise a reflection plate provided in the body portion and configured to open and close an inner opening of the at least one slave docking portion, which corresponds to a region communicating with the body portion.

The reflection plate may include a rotary shaft provided at an edge region of the inner opening and be configured to have an adjustable rotation angle.

The reflection plate may be configured to slide along an inner surface of the body portion to open and close the inner opening.

The battery rack may further comprise a radio wave absorbing body provided to an inner surface of the door.

In another aspect of the present disclosure, there is also provided an energy storage system, comprising the battery rack described above.

Advantageous Effects

The battery rack according to the present disclosure gives the following effects.

Since the transmission path of a wireless signal is controlled through the waveguide provided inside the battery rack, it is possible to secure high reliability of communication between the master module and the plurality of slave modules.

In addition, the battery rack according to the present disclosure is excellent in space efficiency, maintenance and management of the waveguide by configuring the waveguide by utilizing the door of the rack housing.

The effect of the present disclosure is not limited to the above, and effects not mentioned herein will be clearly understood by those skilled in the art from this specification and the accompanying drawings.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
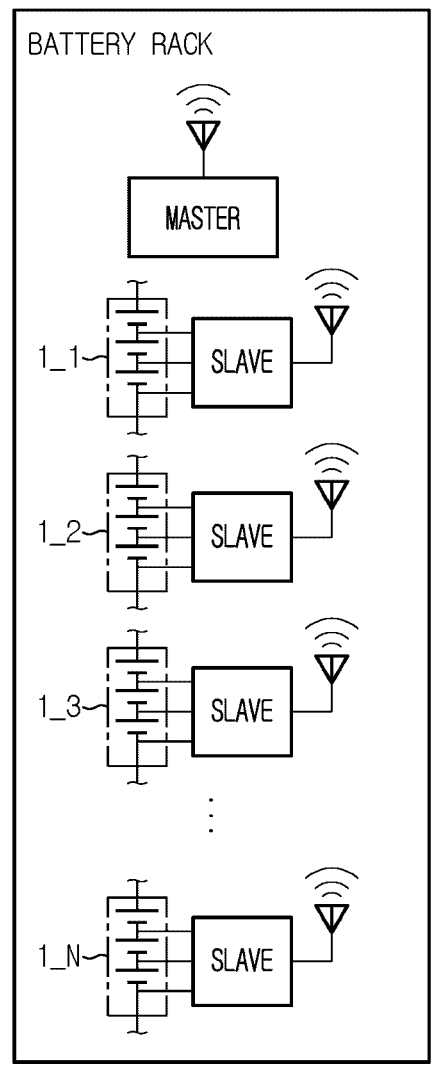
FIG. 1 is a diagram exemplarily showing the configuration of a battery rack including a wireless control system according to the prior art.

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Since the embodiment of the present disclosure is provided to more fully explain the present disclosure to those skilled in the art, the shape and size of components in the drawings may be exaggerated, omitted or schematically illustrated for a clearer description. Therefore, the size or proportion of each component does not fully reflect the actual size or proportion.

Figure 2:
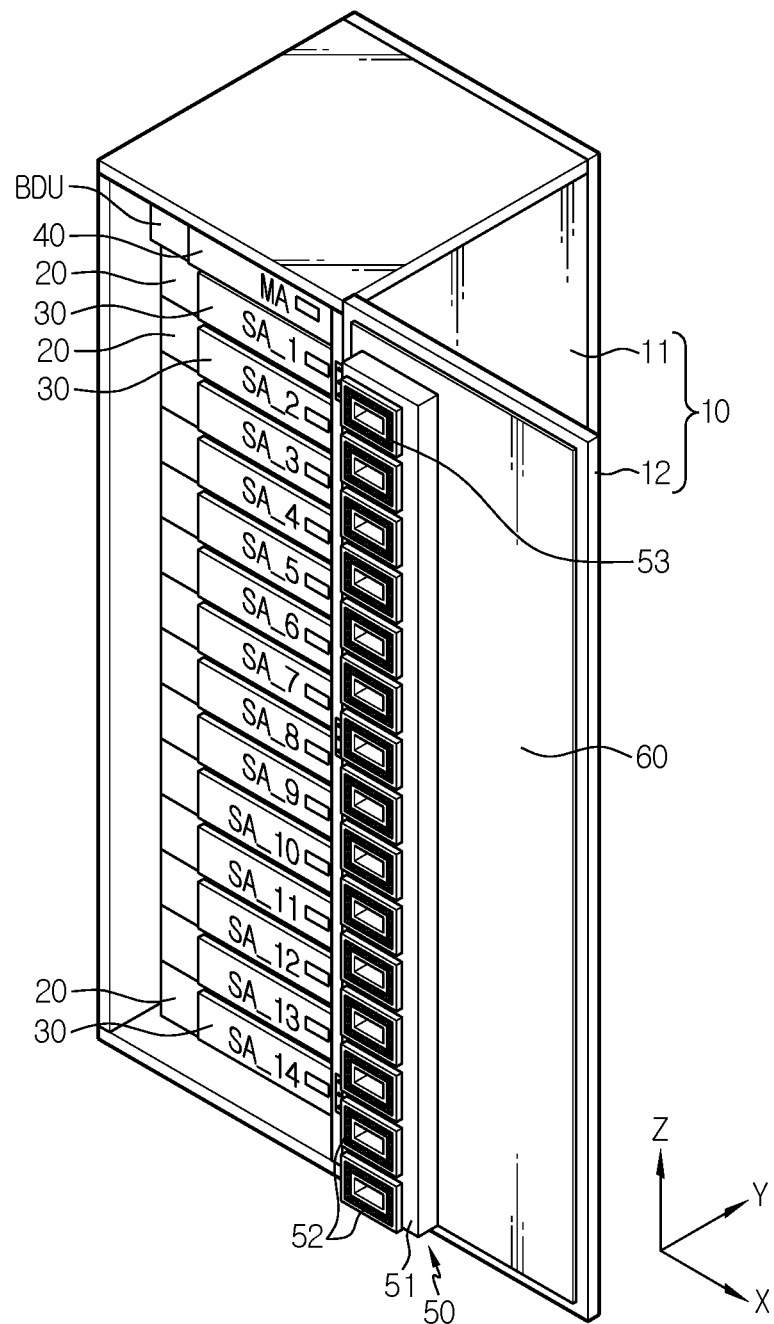
FIG. 2 is a perspective view schematically showing the configuration of a battery rack according to an embodiment of the present disclosure.
Figure 3:
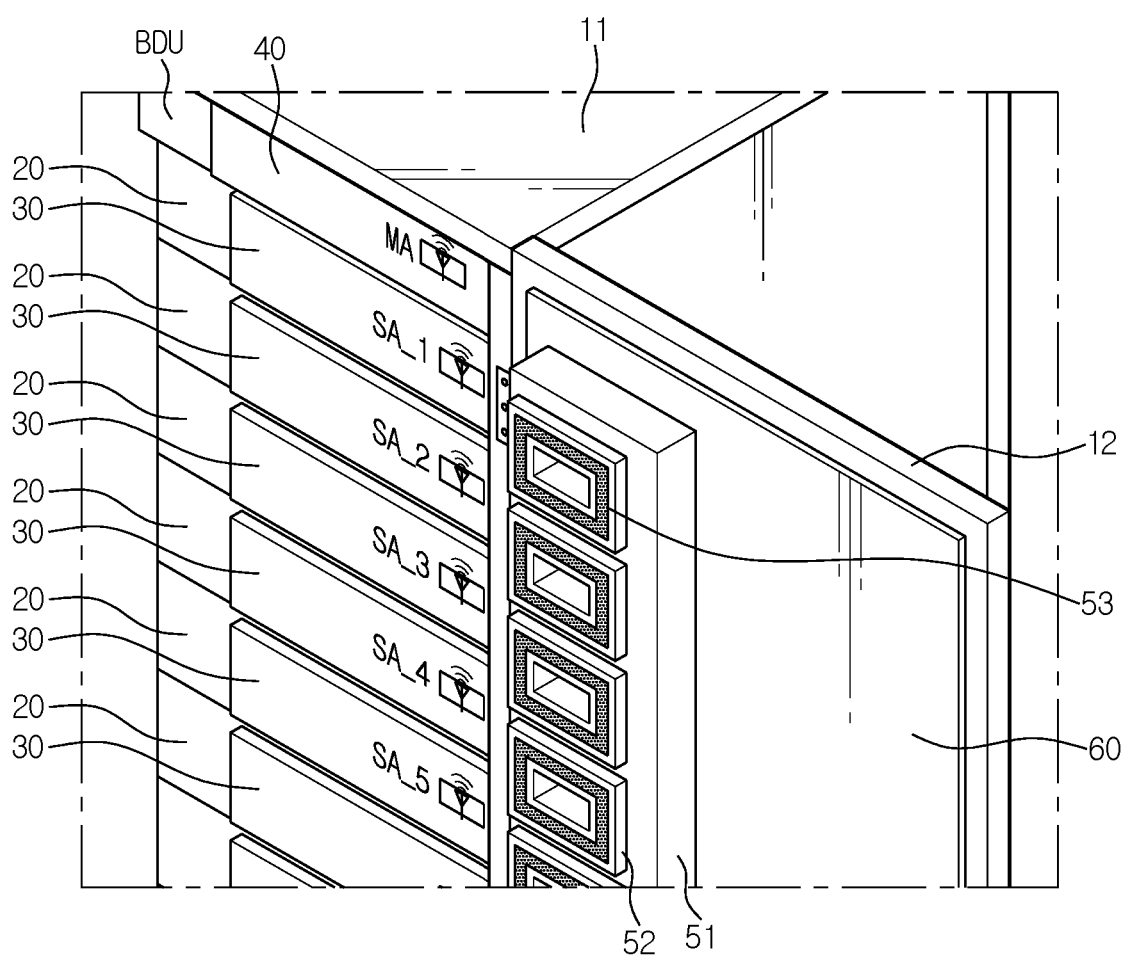
FIG. 3 is a partially enlarged view of FIG. 2

FIG. 2 is a perspective view schematically showing the configuration of a battery rack according to an embodiment of the present disclosure, and FIG. 3 is a partially enlarged view of FIG. 2

Referring to FIGS. 2 and 3, the battery rack according to an embodiment of the present disclosure includes a rack housing 10, a plurality of battery modules 20, a plurality of slave modules 30, a master module 40 and a waveguide 50.

The rack housing 10 includes a cabinet 11 having an inner space formed therein to accommodate a plurality of battery modules 20, and a door 12 provided to open and close the cabinet 11.

The cabinet 11 may include a plurality of shelf plates (not shown) provided in the inner space at a wall thereof in an upper and lower direction, and the battery modules 20 may be supported by the shelf plates, respectively, and arranged in a layered form in an upper and lower direction. The cabinet 11 may include a rear surface having a ventilation structure so that the heat of the battery module 20 may be smoothly dissipated, and the door 12 may be installed at a front surface thereof to be opened and closed.

The door 12 may be coupled to the cabinet 11 using a hinge to be opened and closed to the left and right. As an alternative to the hinge method, a sliding method in which the door 12 is opened and closed parallel to the front surface of the cabinet 11 may be applied.

In addition, the waveguide 50 and the radio wave absorbing body 60 may be further provided at the inner surface of the door 12.

The radio wave absorbing body 60 refers to a material that absorbs an incident radio wave and converts the same into heat not to generate a reflected wave. For example, the radio wave absorbing body 60 may be manufactured in the form of a sheet in which a resin and magnetic powder are mixed, and may be attached to an inner surface of the pack cover. If the radio wave absorbing body 60 is attached to the inner surface of the door 12 in this way, the radio wave that transmits a wireless signal is not reflected by the door 12, thereby minimizing the influence of multipath fading and the influence to other devices due to external reflection. As an alternative to the sheet, a radio wave absorbing paint may also be used. In other words, the same effect as attaching the sheet may be provided by thickly coating the radio wave absorbing paint on the inner surface of the door 12. The waveguide 50 will be described later for convenience of description.

The plurality of battery modules 20 are connected to each other in series or in series and parallel, and each battery module 20 includes at least one battery cell (not shown). The battery cell may employ any of a pouch-type secondary battery, a rectangular secondary battery and a cylindrical secondary battery, but the pouch-type secondary battery having the highest energy density per unit volume in the battery housing may be preferable.

The slave module 30 may be mounted to the front surface of the battery module 20, one for each battery module 20, and is a component that monitors and manages the state of each battery module 20. The slave module 30 may be referred to as a slave BMS (Battery Module System) in the art. Typically, the slave module 30 is mechanically and electrically connected to the battery module 20 and may be provided in an integrated form at one side of the battery module 20. Therefore, the number of slave modules 30 is equal to the number of the plurality of battery modules 20.

Each slave module 30 may include a sensing unit (not shown), a wireless communication circuit (not shown), a slave antenna SA, and a slave control unit (not shown).

The sensing unit may include a voltage measuring circuit, a temperature sensor, and a current sensor.

The voltage measuring circuit measures a module voltage of the battery module 20. The module voltage is a voltage applied to both terminals of the battery module 20. The voltage measuring circuit may further measure a cell voltage of each battery cell included in the battery module 20. The cell voltage is a voltage applied to both terminals of the battery cell. The voltage measuring circuit transmits a voltage signal representing the module voltage and the cell voltage to the slave control unit.

The temperature sensor is disposed within a predetermined distance from the battery module 20 and transmits a temperature signal indicating the temperature of the battery module 20 to the slave control unit.

The current sensor is installed on a charging/discharging current path of the battery rack to measure a current flowing during charging and discharging of the battery rack and transmits a current signal indicating the measured current to the slave control unit.

The wireless communication circuit may be implemented using an RF SoC (System on Chip) in hardware, and is connected to the slave control unit and the slave antenna SA. For the purpose of distinguishing the slave antenna SA provided in each slave module 30, reference signs SA_1 to SA_5 . . . are endowed to the slave antenna SA in the order of communication distance close to the master antenna MA in FIG. 2. The wireless communication circuit may wirelessly transmit data to the master module 40 or wirelessly receive data from the master module 40 through the slave antenna SA. In addition, if a certain signal is received through the slave antenna SA, the wireless communication circuit may measure signal intensity of the received signal.

The slave control unit may be operatively coupled to the sensing unit and the wireless communication circuit and configured to individually control the operation of the sensing unit and the wireless communication circuit.

A battery disconnection unit (BDU) may be disposed at the top of the battery modules 20 inside the cabinet 11. The battery disconnection unit (BDU) is one of power control components and refers to a part that is composed of a relay, a current sensor, a resistor, and the like and connects or disconnects power between a battery and a load. The master module 40 may be provided in an integrated form with the battery disconnect unit.

The master module 40 is a component that integrally controls the battery rack and is configured to communicate with an external main controller through a wired network such as CAN (Control Area Network).

In addition, the master module 40 includes a wireless communication circuit (not shown), a master control unit (not shown) and a master antenna MA, and is configured to make wireless communication with each slave module 30 through the master antenna MA.

The wireless communication circuit is configured to wirelessly transmit a command packet to the slave module 30 through the master antenna MA. In addition, the wireless communication circuit is configured to receive a response packet from the slave module 30 through the master antenna MA.

Each of the plurality of slave modules 30 performs wireless communication with the master module 40 by using its ID allocated in advance, and the master module 40 stores the ID allocated to the plurality of slave modules in advance. The ID is identification information for distinguishing the plurality of slave modules.

The master module 40 calculates SOC (state of charge), SOH (state of health), or the like of each battery module 20 based on battery information provided from the slave module 30, or determine whether or not there is overvoltage, under-voltage, overcharge or overdischarge.

The master control unit is operatively connected to the wireless communication circuit. The master control unit may determine a request item for at least one of the plurality of slave modules based on the signal received through the master antenna MA, and wirelessly transmit a command packet including data representing the request item to at least one of the plurality of slave modules 30.

Meanwhile, the battery rack according to an embodiment of the present disclosure includes a waveguide 50 for forming a wireless communication path so that the path of wireless communication between the plurality of slave modules 30 and the master module 40 may be controlled.

Hereinafter, the configuration and operation of the waveguide 50 will be described in detail with reference to FIGS. 4 to 8 along with FIGS. 2 and 3.

The waveguide 50 serves to transmit radio waves while minimizing the energy loss of radio waves and external noise interference between an antenna and a receiver, and is provided in the form of a hollow metal tube with a rectangular or circular section. Also, the size of the waveguide 50 may be variously determined according to the wireless communication frequency.

The waveguide 50 allows electromagnetic waves to move along the limited inner space of the waveguide 50, and a current does not flow inside the waveguide 50, thereby reducing energy loss of the electromagnetic waves. In addition, since the inside of the waveguide 50 is filled with air, the dielectric loss is also small.

This embodiment is directed to a method for using the waveguide 50 as a wireless transmission path between each slave module 30 and the master module 40, and the waveguide 50 is configured using the door 12 described above. That is, as shown in FIG. 2, the waveguide 50 installed at the inner surface of the door 12 is configured to function as a wireless communication path between each slave antenna SA and the master antenna MA when the door 12 is completely closed. For reference, the waveguide 50 may be installed at the door 12 using a bracket (not shown) and a bolt, or the waveguide 50 may be installed at the door 12 by welding the waveguide 50 to the inner surface of the door 12. As another method, it is possible to manufacture the waveguide 50 and the door 12 integrally.

Figure 4:
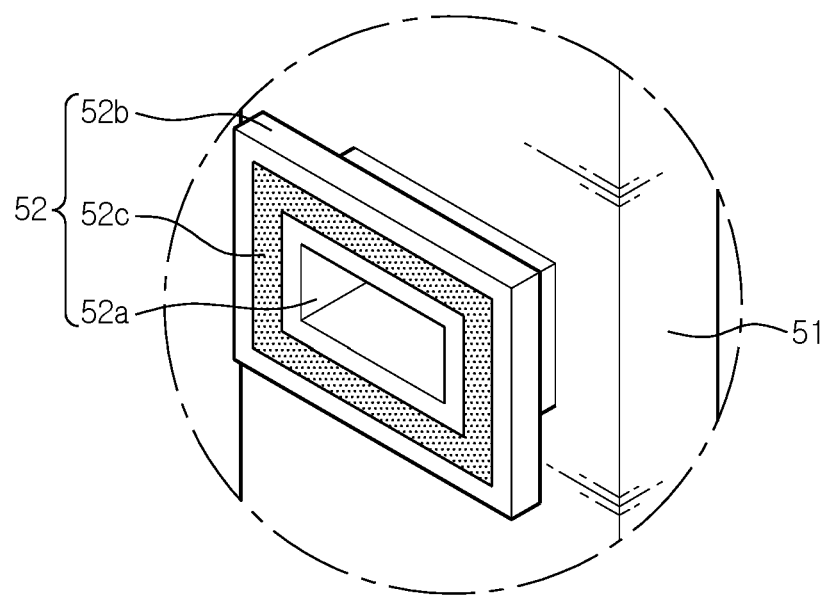
FIG. 4 is a diagram showing a slave docking portion of FIG. 3.

Specifically, the waveguide 50 includes a body portion 51, a plurality of slave docking portion 52 and one master docking portion 53, as shown in FIGS. 3 and 4.

The body portion 51 is provided in the shape of a hollow metal tube and is disposed to extend along the height direction of the door 12. The body portion 51 is formed in a hollow rectangular shape and, for example, when using a bandwidth of about 80 MHz in a 2 GHz frequency band for wireless communication, the inner space of the body portion 51 may suitably have a width of about 80 mm and a length of about 30 mm.

The slave docking portion 52 is provided in plural, and the plurality of slave docking portions 52 are provided along the extending direction of the body portion 51 at intervals corresponding to the interlayer intervals of the battery modules 20. One side of the slave docking portion 52 communicates with the body portion 51 and the other side thereof is provided to make surface contact with the slave module 30 of each battery module 20 when the door 12 is closed.

The slave docking portion 52 includes an outer opening 52*a* provided to protrude from the outer surface of the body portion 51, a flange 52*b* formed to expand along the periphery of the outer opening 52*a*, an electromagnetic wave shield gasket 52*c* interposed in the flange 52*b*, and an inner opening 52*e*.

The outer opening 52*a* covers the slave antenna SA by having a size corresponding to the area of the region of the slave module 30 where the slave antenna SA is located so that the wireless radio wave signal may be transmitted most efficiently into the waveguide 50.

The flange 52*b* is a portion to make surface contact with the module cover that forms an appearance of the slave module 30. By using the flange 52*b* to expand the contact area with the module cover, it is possible to prevent the module cover from being engraved or scratched and to alleviate the impact that may be applied to the slave module 30.

In order to minimize external radio interference, the outer region of the module cover making contact with the flange 52*b* may be made of a metal having an electromagnetic wave shielding function, or a non-metallic material having a sheet or paint with an electromagnetic wave shielding function on a surface thereof. That is, the module cover may be made of a radio wave blocking material or coated with a radio wave blocking material, except for a region where the slave antenna SA is located therein.

The electromagnetic wave shield gasket 52*c* is to eliminate external electromagnetic wave interference that may be introduced into the waveguide 50, and an electromagnetic wave absorbing sponge prepared by specially coating a soft foam such as a polyurethane foam with an electromagnetic wave absorbing material may be applied. The electromagnetic wave absorbing sponge may be attached to the surface of the flange 52*b* by an adhesive or the like. Since the electromagnetic wave absorbing sponge has excellent flexibility and elasticity due to its natures, it also has a scratch prevention effect when it comes into contact with the module cover.

Figure 5:
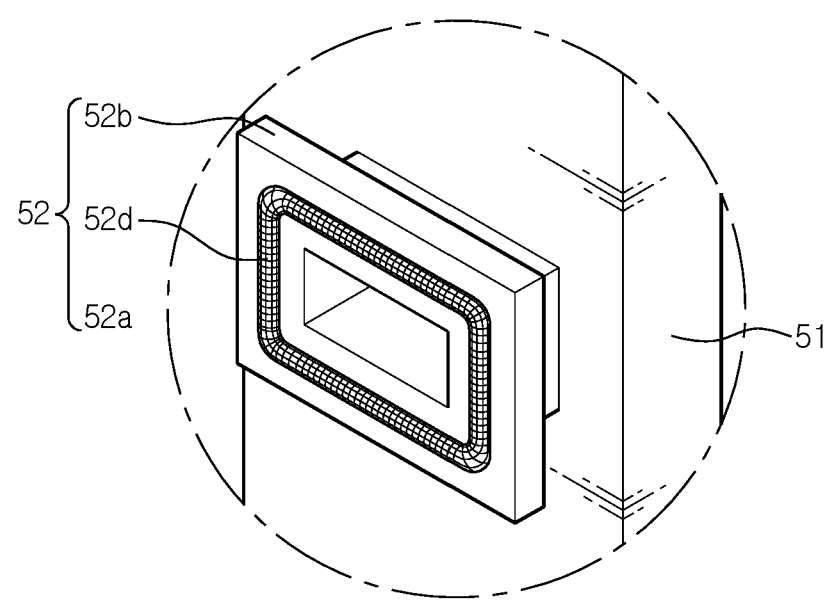
FIG. 5 is a diagram corresponding to FIG. 4, which shows a modified example of a shield gasket.

As an alternative to the electromagnetic wave absorbing sponge, a wire mesh shield gasket 52*d* as shown in FIG. 5 may be employed. The wire mesh shield gasket 52*d* is highly flexible by weaving metal wires in a knitting method and has excellent electromagnetic wave shielding effect due to excellent contact with a counterpart. Silicone elastomer, urethane sponge, or the like may be inserted into the wire mesh as a core material.

The wire mesh shield gasket 52*d* may be interposed in the flange 52*b* by being attached to the surface of the flange 52*b* using an adhesive tape, or by providing a groove at the flange 52*b* and being inserted and fixed in the groove, as a modified example.

The master docking portion 53 has substantially the same structure as the slave docking portion 52 described above, but is different in that a connection target is the master module 40. That is, the master docking portion 53 (see FIG. 3) is provided so that one side thereof communicates with the body portion 51 and the other side thereof makes surface contact with the master module 40. In addition, the outer opening 52*a* of the master docking portion 53 may be provided in a size capable of covering the location of the master antenna MA in the master module 40.

Figure 6:
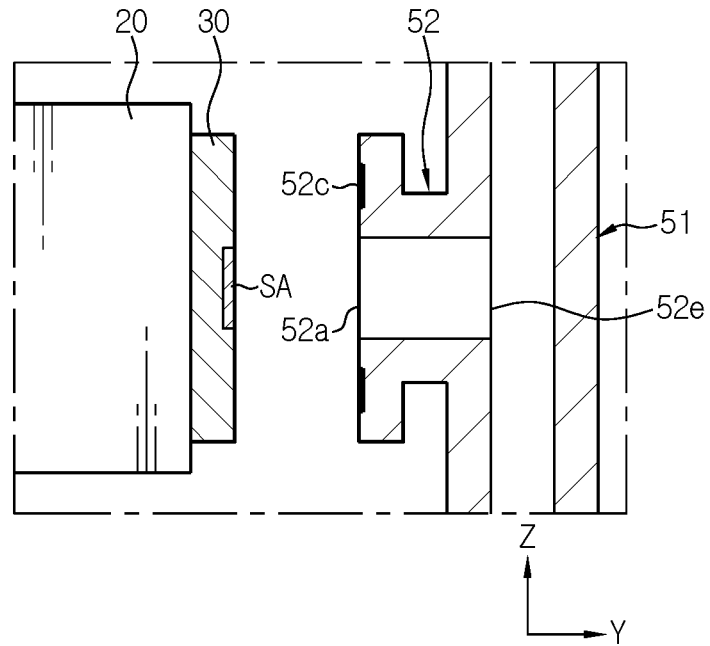
FIGS. 6 and 7 are sectional views for illustrating a state before and after a waveguide and a slave module according to an embodiment of the present disclosure are connected, respectively.
Figure 7:
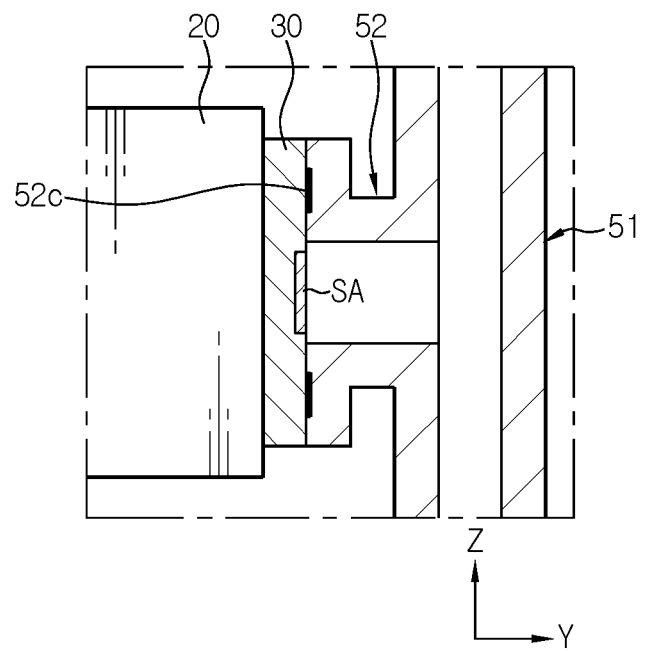
Figure 8:
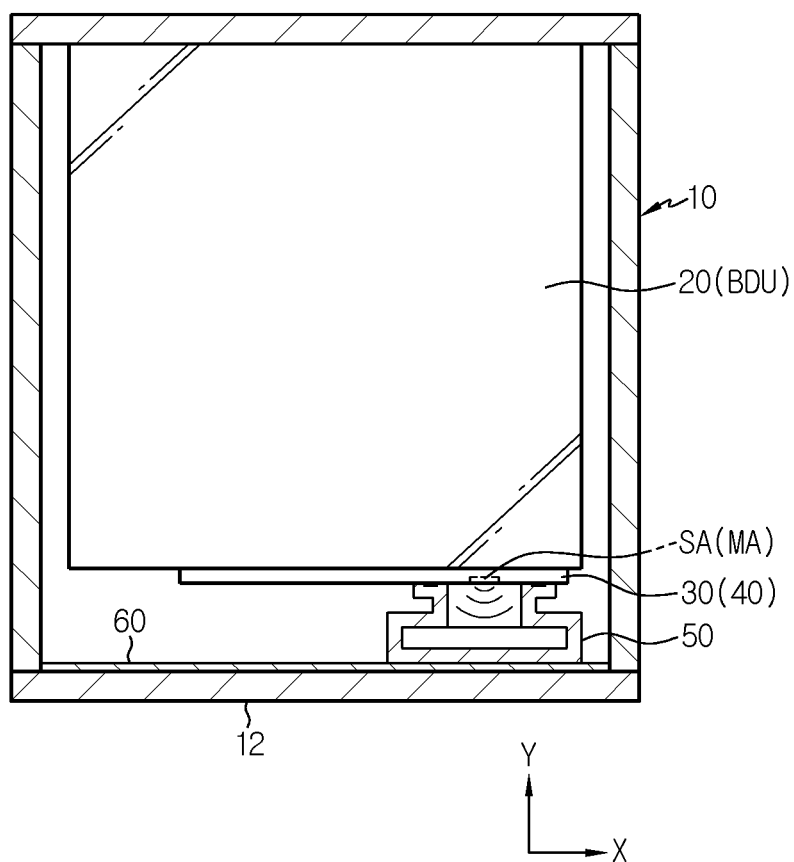
FIG. 8 is a diagram showing the internal structure of the battery rack when a door of a rack housing is closed according to an embodiment of the present disclosure.

Next, a connection structure between the waveguide 50 and each slave module 30 or the master module 40 will be described with reference to FIGS. 6 to 8.

In the door 12, each slave docking portion 52 of the waveguide 50 is located at a height (in the Y-axis direction) corresponding to the height of each battery module 20, and is located in the left and right direction. (X-axis direction) to make surface contact with the slave module 30 when the door 12 is closed. In the door 12, the master docking portion 53 is located at a height corresponding to the height of the master module 40, and like each slave docking portion 52, is located in the left and right direction to make surface contact with the master module 40 when the door 12 is closed.

Therefore, when the door 12 is closed, each slave docking portion 52 may be matched with each slave module 30 and the master docking portion 53 may be matched with the master module 40. At this time, as shown in FIGS. 7 to 8, since each slave antenna SA and the master antenna MA are covered by the slave docking portion 52 or the master docking portion 53, the radio wave transmission path of the wireless signal between each slave module 30 and the master module 40 may be confined within the waveguide 50. In addition, since the radio wave absorbing body 60 is applied to the contact region between each slave module 30 or the master module 40 and the waveguide 50 at the inner surface of the door 12, interference of external radio waves may be minimized.

As described above, according to an embodiment of the present disclosure, high reliability of communication between the master module 40 and the plurality of slave modules 30 may be secured by controlling the transmission path of the wireless signal through the waveguide 50 provided inside the battery rack. In addition, in the battery rack according to the present disclosure, since the waveguide 50 is provided to the door 12 of the rack housing 10, even if the waveguide 50 is installed, the volume ratio of the battery rack does not decrease significantly. Also, since the waveguide 50 may be separated from the door 12, the waveguide 50 may be easily maintained and managed.

Figure 9:
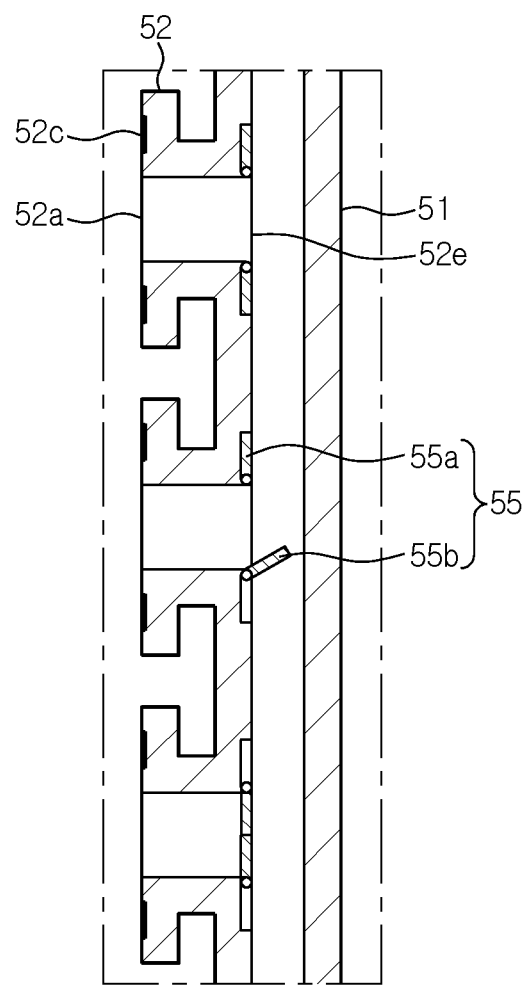
FIG. 9 is a diagram schematically showing the internal configuration of a waveguide according to another embodiment of the present disclosure.
Figure 10:
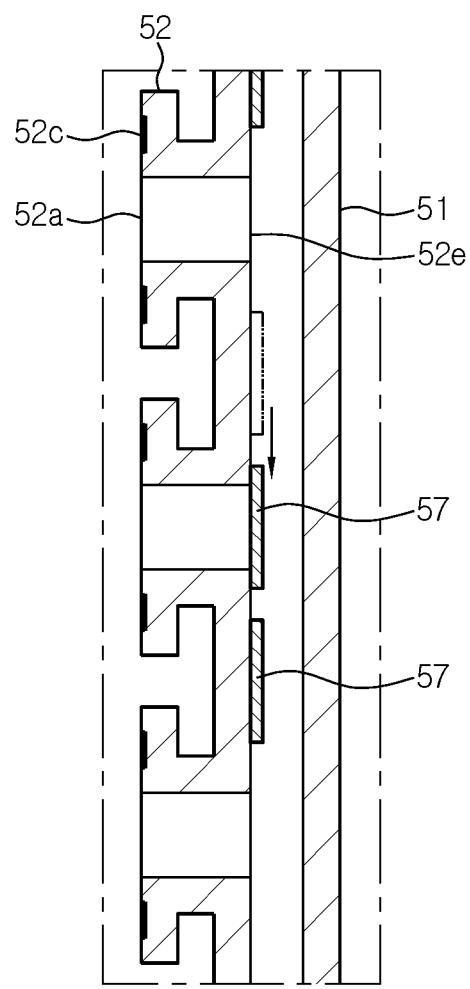
FIG. 10 is a diagram corresponding to FIG. 9, which shows a modified example of a reflection plate of FIG. 9.

FIG. 9 is a diagram schematically showing the internal configuration of the waveguide 50 according to another embodiment of the present disclosure, and FIG. 10 is a diagram corresponding to FIG. 9, which shows a modified example of the reflection plate of FIG. 9.

Next, another embodiment of the present disclosure will be described with reference to FIGS. 9 and 10. The same reference signs as those in the former embodiment indicate the same components and will not be described in detail again, and different features from the former embodiment will be described in detail.

The battery rack according to another embodiment of the present disclosure further includes a reflection plate 55 inside the waveguide 50, as compared with the battery rack of the former embodiment.

The reflection plate 55 is provided inside the body portion 51 to open and close the inner opening 52e of each slave docking portion 52. For example, two reflection plates 55 may be configured to cover the inner opening 52e, or one reflection plate 55 may be made large enough to cover the inner opening 52e at once.

The reflection plate 55 includes a rotary shaft at an edge region of the inner opening 52e in the inner surface of the body portion 51 and may be provided to rotate in a range of 0 degrees to 180 degrees. The rotation angle of the reflection plate 55 may be precisely adjusted by connecting a servo motor (not shown) to the rotary shaft. The servo motor may be connected to the control unit of each slave module 30 or the control unit of the master module 40 by wire or wirelessly and be operated according to a command of the control unit.

As an alternative to the rotation-type reflection plate 55, the reflection plate 57 may be configured to linearly reciprocate along the inner surface of the body portion 51 in a sliding manner. For example, a rack-and-pinion driving mechanism may be applied to the reflection plate 57 to move the reflection plate 57, and a servo motor may be used to precisely control the movement distance of the reflection plate 57, like the rotation-type reflection plate 57.

According to the configuration of another embodiment of the present disclosure as above, the transmission path of the wireless signal may be controlled more effectively, compared to the former embodiment. For example, as shown in FIGS. 9 to 10, the communication path of the slave module 30 that is not communicating with the master module 40 may be shielded by the reflection plates 55, 57 to minimize radio wave interference. Also, the communication path of each slave module 30 communicating with the master module 40 may be more effectively controlled by the reflection plates 55, 57. For example, the master module 40 or each slave module 30 may detect a signal intensity through RSSI (Received Signal Strength Indication) and looks for an optimal opening angle of the reflection plate 55 when the signal transmitted and received to/from the master antenna MA is smoothest, for each slave antenna SA. The reflection plate 55 is adjusted suitable for the optimum opening angle for each slave module 30 so that the signal intensity may be maintained at an appropriate level or above.

Figure 11:
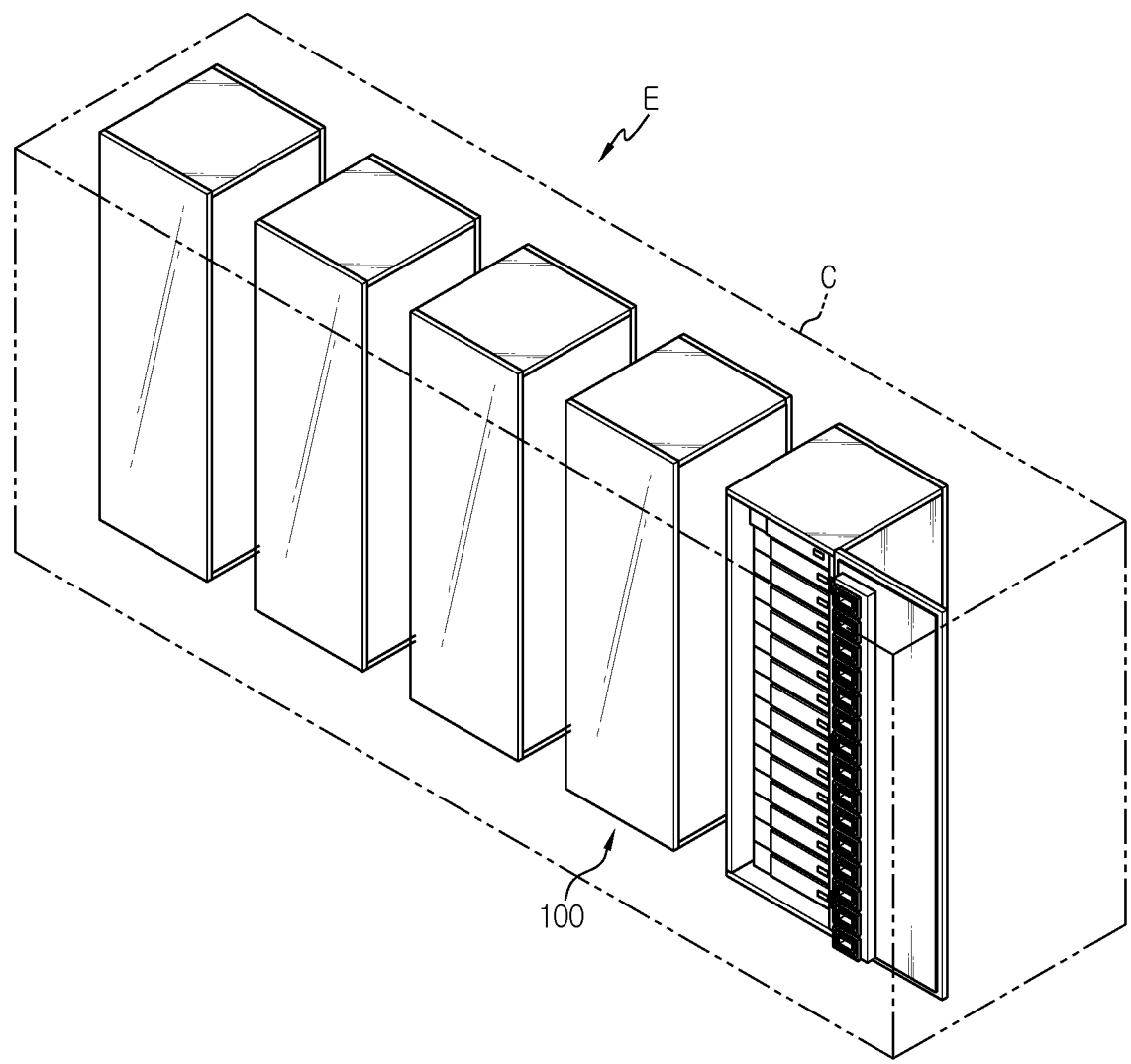
FIG. 11 is a diagram schematically showing the configuration of an energy storage system according to an embodiment of the present disclosure.

FIG. 11 is a diagram schematically showing the configuration of an energy storage system according to an embodiment of the present disclosure.

Referring to FIG. 11, the energy storage system E may be used as an energy source for home or industrial use. The energy storage system E may include a plurality of the battery rack 100 described above, and a rack container C for accommodating the plurality of battery rack 100.

Since the energy storage system E according to this embodiment includes the battery rack 100, it includes all the advantages of the battery rack 100 described above.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left and right directions are used in the specification, it is obvious to those skilled in the art that these merely represent relative locations for convenience in explanation and may vary based on a location of an observer or an object to be observed.

What is claimed is:

1. A battery rack, comprising:
    a rack housing having a cabinet with an inner space formed therein and a door provided to open and close the cabinet;
    a plurality of battery modules disposed in the inner space of the cabinet stacked in an upper and lower direction;
    a plurality of slave modules respectively mounted to the plurality of battery modules to monitor a state of each battery module of the plurality of battery modules, each slave module of the plurality of slave modules having a slave antenna for wireless communication;
    a master module disposed at one of an interlayer, a top and a bottom of the plurality of battery modules to manage states of the plurality of battery modules based on information provided from the plurality of slave modules and having a master antenna for wireless communication; and
    a waveguide installed at an inner surface of the door to form a wireless communication path between the plurality of slave modules and the master module,
    wherein the waveguide includes:
        a body portion having a hollow tube shape and disposed to extend along a height direction of the door;
        at least one slave docking portion having a first side provided to communicate with the body portion and a second side provided to make surface contact with a slave module of the plurality of slave modules when the door is closed; and
        a master docking portion having a first side provided to communicate with the body portion and a second side provided to make surface contact with the master module when the door is closed.

2. The battery rack according to claim 1, wherein the at least one slave docking portion is a plurality of slave docking portions, and the plurality of slave docking portions are located at every interval corresponding to an interval of the plurality of battery modules.

3. The battery rack according to claim 1, wherein the at least one slave docking portion or the master docking portion includes:

an outer opening provided to cover a location of the slave antenna in at least one slave module of the plurality of slave modules or a location of the master antenna in the master module;

a flange formed to expand along a periphery of the outer opening; and a shield gasket having an external electromagnetic wave shielding function and interposed in the flange.

4. The battery rack according to claim 3, wherein the shield gasket is one of a wire mesh gasket and an electromagnetic wave absorbing sponge provided by coating a soft foam with an electromagnetic wave absorbing material.

5. The battery rack according to claim 3, wherein the at least one slave module and the master module each include a module cover forming an outer surface, and wherein the module cover is made of a radio wave blocking material or coated with a radio wave blocking material, except for a region where the slave antenna or the master antenna is located.

6. The battery rack according to claim 1, further comprising:

a reflection plate provided in the body portion and configured to open and close an inner opening of the at least one slave docking portion, which corresponds to a region communicating with the body portion.

7. The battery rack according to claim 6, wherein the reflection plate includes a rotary shaft provided at an edge region of the inner opening and having an adjustable rotation angle.

8. The battery rack according to claim 6, wherein the reflection plate is configured to slide along an inner surface of the body portion to open and close the inner opening.

9. The battery rack according to claim 1, further comprising:

a radio wave absorbing body provided to an inner surface of the door.

10. An energy storage system, comprising the battery rack according to claim 1.

* * * * *